Figure 1:
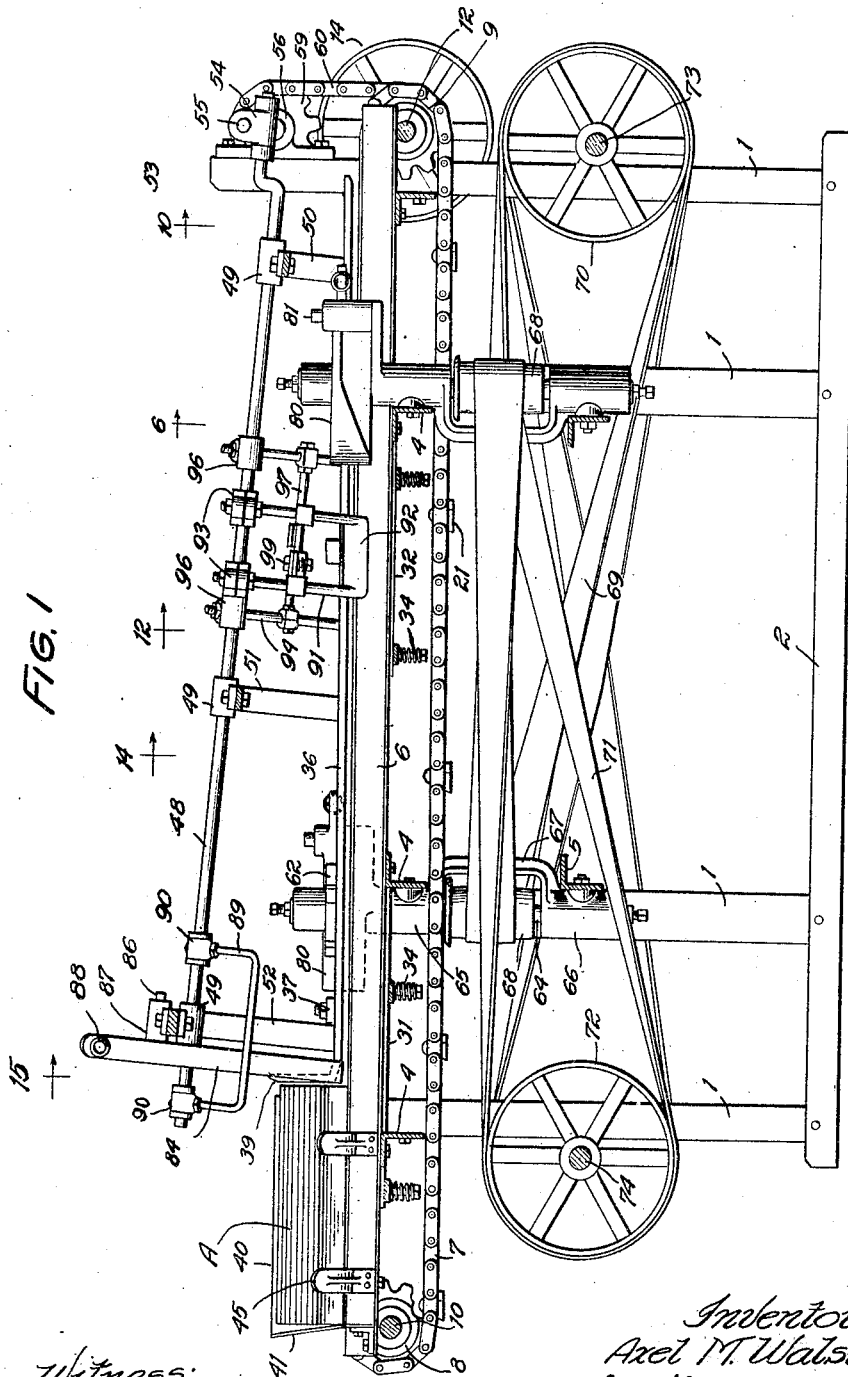

May 5, 1925.

A. M. WALSTROM 1,536,250

MACHINE FOR MAKING TUBS AND THE LIKE

Filed Oct. 3, 1923  7 Sheets-Sheet 1

Witness:
John E. Titus

Inventor
Axel M. Walstrom
by Hewitt S. Dixon
Atty.

May 5, 1925.

A. M. WALSTROM 1,536,250

MACHINE FOR MAKING TUBS AND THE LIKE

Filed Oct. 3, 1923 7 Sheets-Sheet 3

Inventor
Axel M. Walstrom
by Hewitt S. Dixon
Atty

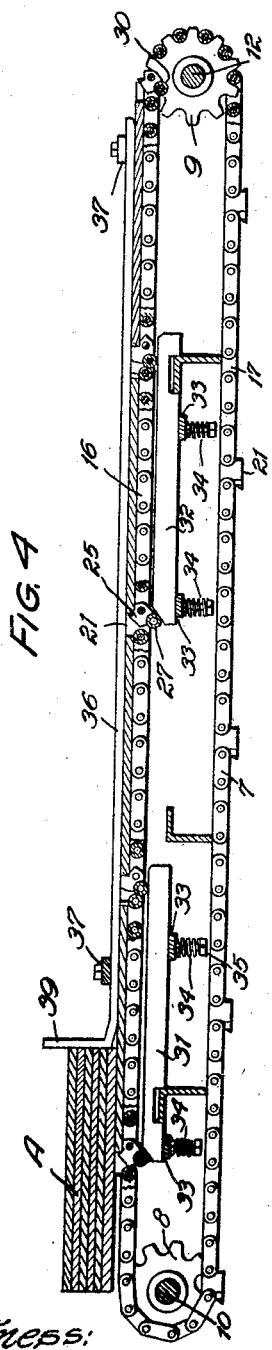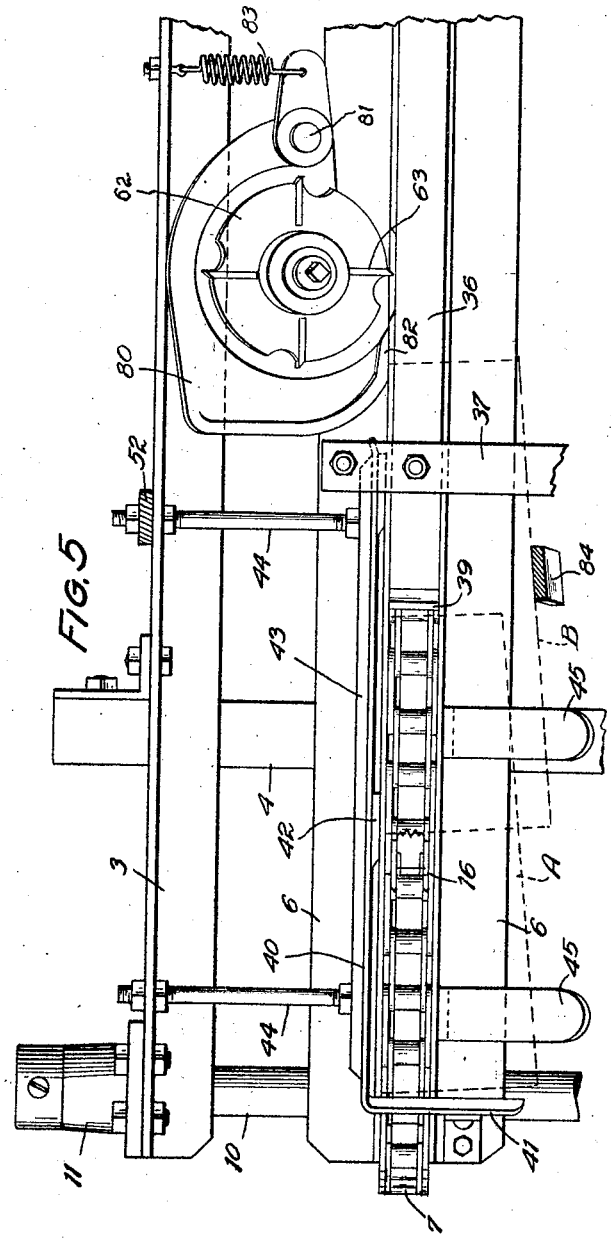

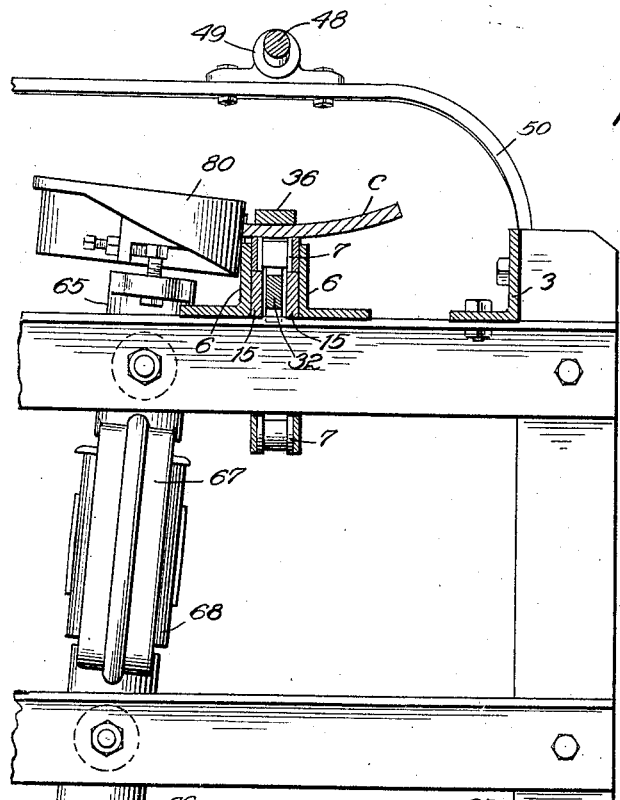
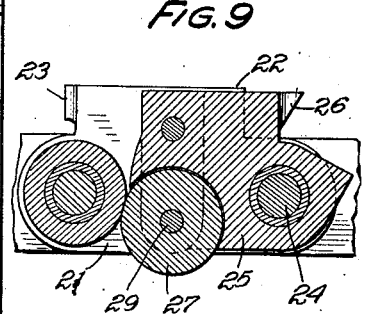
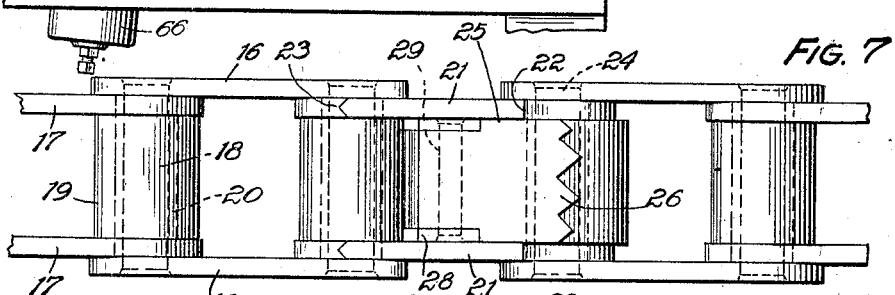
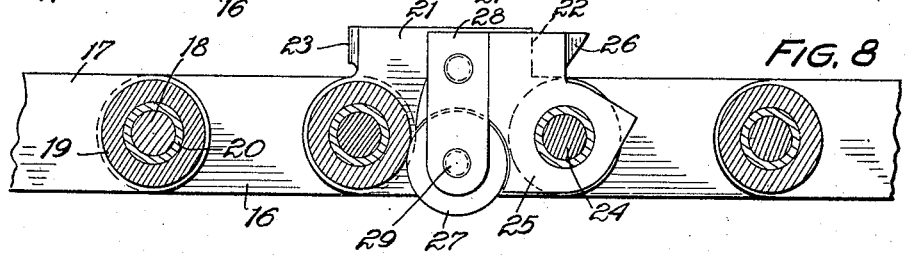

May 5, 1925. 1,536,250
A. M. WALSTROM
MACHINE FOR MAKING TUBS AND THE LIKE
Filed Oct. 3, 1923　　7 Sheets-Sheet 6
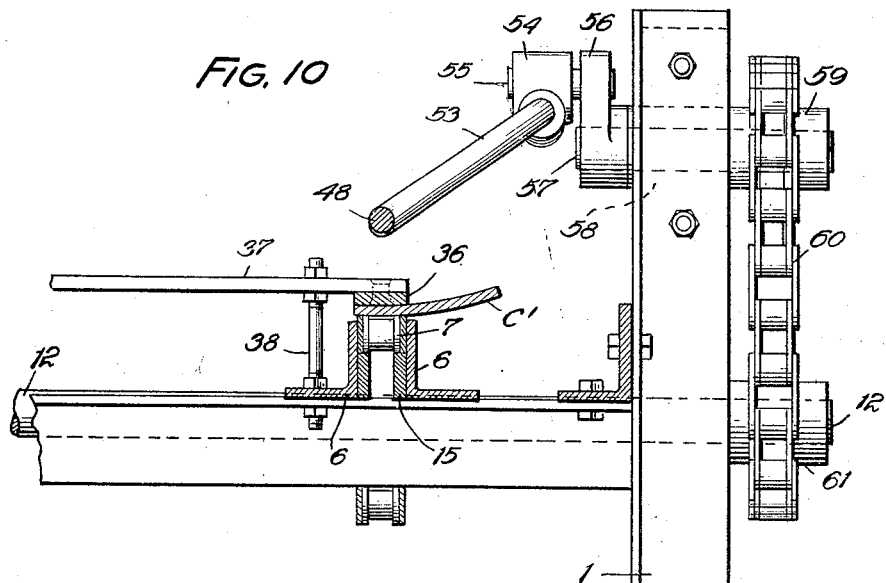
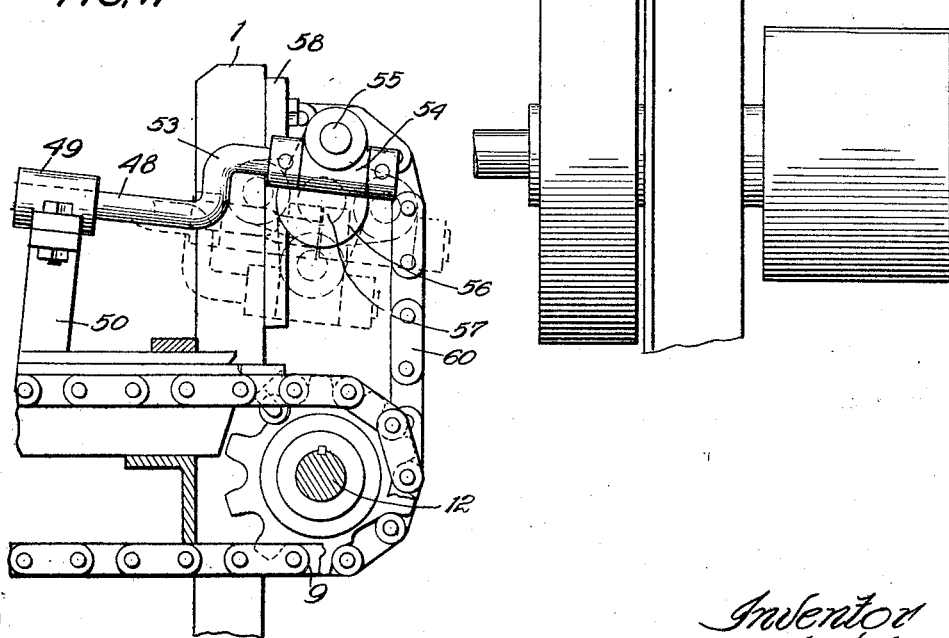
Witness:
John E. Titus
Inventor
Axel M. Walstrom
by Hewitt S. Dixon
Atty May 5, 1925.　　　　　　　　　　　　　　　　　　　1,536,250
A. M. WALSTROM
MACHINE FOR MAKING TUBS AND THE LIKE
Filed Oct. 3, 1923　　　7 Sheets-Sheet 7

Witness:
John C. Titus

Inventor
Axel M. Walstrom
by Hewitt S. Dixon
Atty

Patented May 5, 1925.

1,536,250

UNITED STATES PATENT OFFICE.

AXEL M. WALSTROM, OF MINNEAPOLIS, MINNESOTA, ASSIGNOR TO THE CREAMERY PACKAGE MFG. COMPANY, OF CHICAGO, ILLINOIS, A CORPORATION OF ILLINOIS.

MACHINE FOR MAKING TUBS AND THE LIKE.

Application filed October 3, 1923. Serial No. 666,280.

*To all whom it may concern:*

Be it known that I, AXEL M. WALSTROM, a citizen of the United States, residing at Minneapolis, in the county of Hennepin and State of Minnesota, have invented certain new and useful Improvements in Machines for Making Tubs and the like, of which the following is a specification.

The invention relates to machinery for the manufacture of tubs and like containers of stave construction, and more particularly to a machine for shaping or jointing the staves.

Tubs and similar containers are commonly tapered in form, and the staves of which they are constructed are usually of widely variant widths. It will be obvious that the proper jointing of the assembled staves in a tapered container requires that the staves be shaped with their lateral edges converging toward the small end of the container, and that the angles of convergence of the edges of the staves vary proportionately to the width of the stave; also, that the stave edges must be correctly beveled so that their contacting surfaces effect a tight joint when assembled.

It has been the common practice heretofore to form the edges of tub and similar staves by manually positioning them for cutting, in which operation the correctness of the variable angular relations mentioned and the amount of material wasted have been dependent upon the skill of the operator, with quite uncertain results.

The primary object of this invention is to provide a machine for shaping the lateral edges of staves of variable widths, which automatically positions and cuts each stave with the correct angle of convergence and bevel of its lateral edges proportionate to the width of the stave, with a minimum waste of material, and with great saving of time and labor.

Further objects include the provision in such a machine of automatic mechanisms for moving staves successively through the machine and securing them in successively variant lateral positions for operation thereupon by successive cutters, and for laterally shifting the position of the moving staves between operations to effect the cutting of their edges at variable angles proportionate to their width.

Other objects and advantages will be apparent in the following detailed description of a preferred embodiment of my invention which I have selected for illustration in the accompanying drawings. It will be understood, however, that various changes in form, construction and arrangement may be made by those skilled in the art without departing from the spirit and scope of the invention as expressed in the appended claims.

Figure 2:
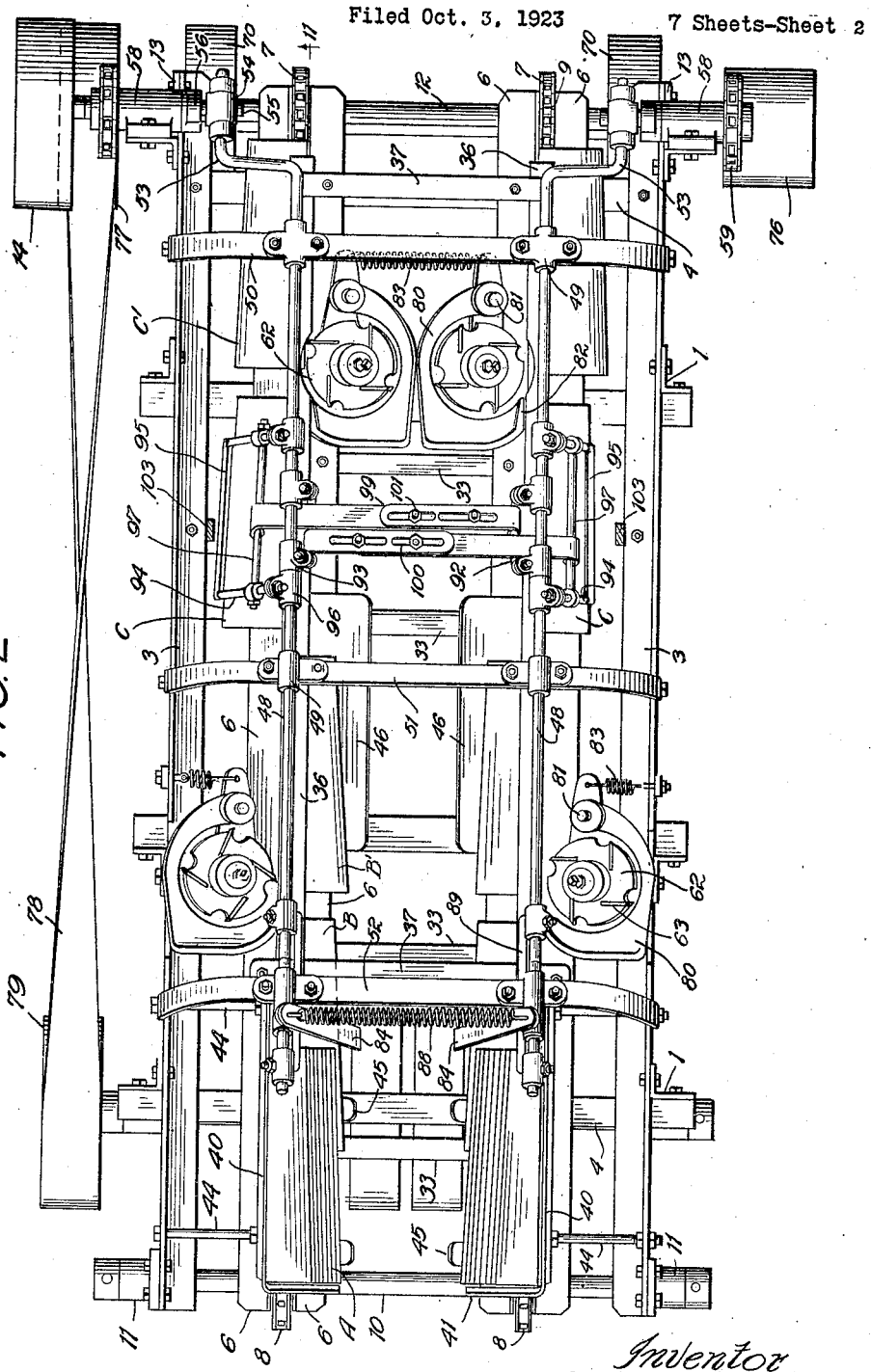
Figure 3:
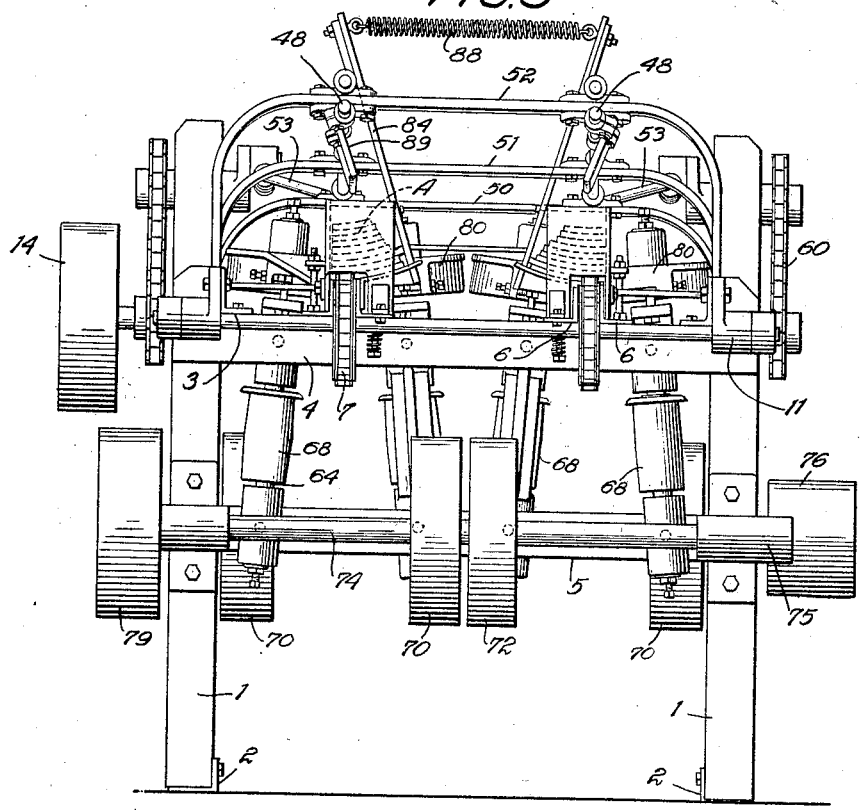
Figure 15:
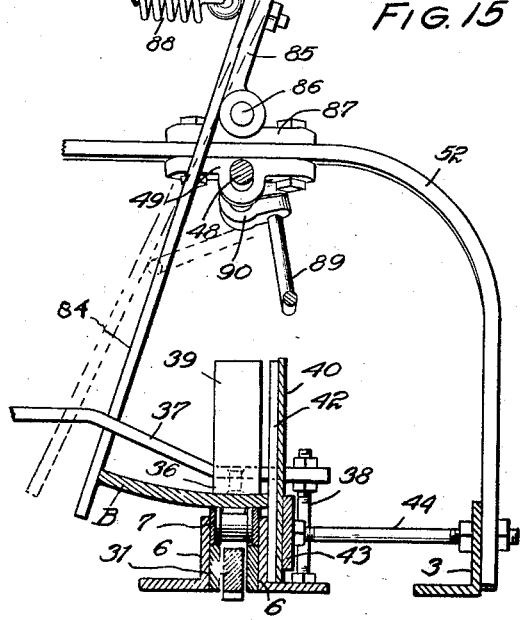
Figure 12:
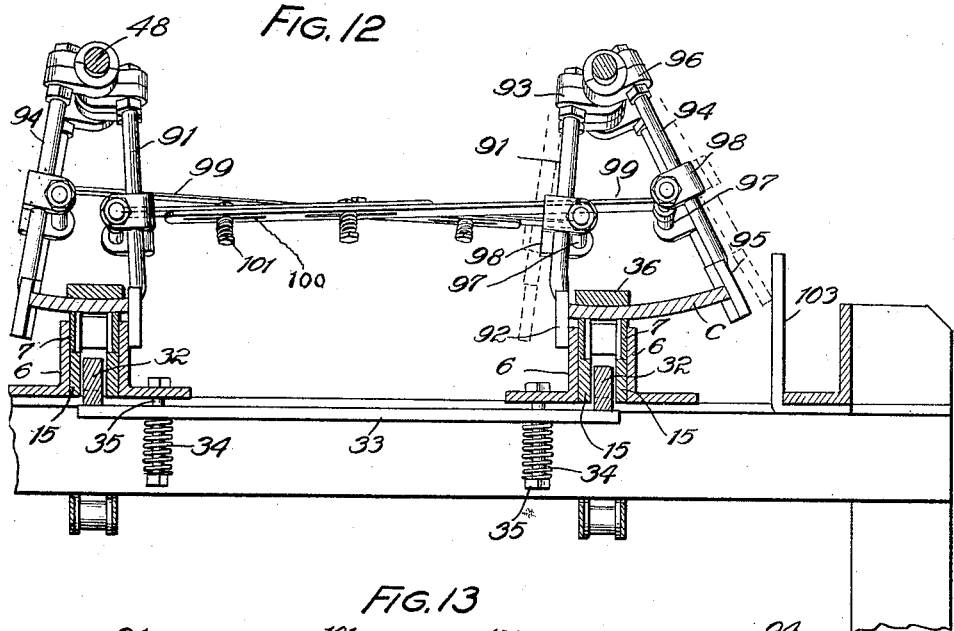
Figure 13:
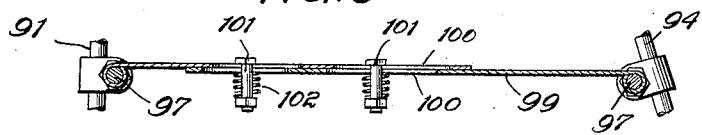
Figure 14:
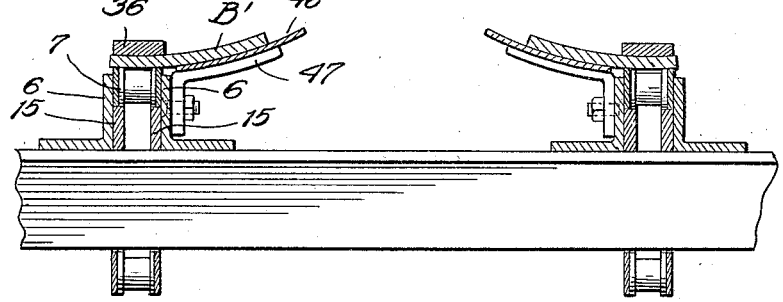

Referring to the drawings, Fig. 1 represents a sectional elevation of the machine. Fig. 2 is a plan view. Fig. 3 is an end elevation. Fig. 4 is a detailed side view of one of the carrier chains and the stave engaging devices. Fig. 5 is a fragmentary plan view of one of the chains in relation to one of the first cutter heads. Fig. 6 is a fragmentary vertical section taken on the plane of the line 6—in Fig. 1, illustrating the chain and its supports in relation to one of the second cutter heads. Figs. 7, 8 and 9 are detailed views of the stave engaging devices carried by the chains. Fig. 10 is a fragmentary cross sectional elevation taken on the plane of the line 10—in Fig. 1, illustrating the driving connections for the mechanism actuating the stave positioning bars. Fig. 11 is a fragmentary longitudinal sectional elevation of the similar parts, taken on the plane of the line 11—in Fig. 2. Fig. 12 is a fragmentary cross sectional elevation taken on the plane of the line 12—in Fig. 1, illustrating the actuating mechanism for the second set of stave positioning bars. Fig. 13 is a detail of a part of the latter. Fig. 14 is a fragmentary sectional elevation taken on the plane of the line 14—in Fig. 1. Fig. 15 is a fragmentary sectional elevation taken on the plane of the line 15—in Fig. 1, illustrating the mechanism for actuating the first set of the positioning bars.

I will first state generally the operative arrangement of the machine, herein illustrated, as adapted to the jointing of staves for butter tubs. Staves are commonly cut in the rough from "bolts" of wood of such shape and by apparatus which produce stock of variant widths in double tub-stave lengths approximately tapered from the center toward both ends and approximately curved laterally in accordance with the dimensions of the assembled tub. The lengths are halved, and the cut pieces of single tub staves thus formed are stacked at one end of the machine. An endless chain travelling beneath the stack carries devices adapted to engage the lowermost staves successively and move them forward through the machine.

As each stave is moved out from the stack it passes into the path of a laterally swinging bar which engages the stave and moves it against oppositely positioned guide stops, whereupon the engaging devices on the carrier chain operate to lock the stave in its adjusted position. The continuously forwardly moving stave is then carried into engagement with a revolving cutter which finishes the lateral edge of the stave alined by the guide stops, the stave thereafter being released from the locking engagement of the carrier devices. The correct bevel of the finished edge is accomplished by an angular mounting of the cutters.

In the further progress of the stave the latter passes into the path of and between a pair of laterally moving bars, one of which engages the unfinished lateral edge of the stave and positively moves the stave across the carrier chain and into position for operation upon the unfinished edge by a second revolving cutter. During this lateral movement of the stave the other of the pair of bars resistantly engages the opposite finished edge of the stave and serves as a positioning guide. The resistant guide bar is so arranged in its construction and support that, as it is pushed by the positive movement of the stave, its engaging surface is at all times in true angular relation to the line of longitudinal movement of the stave tangent to the second cutter head, so that a stave, of whatever width, is accurately positioned at the termination of this lateral movement, for the finishing cut of its second lateral edge at the angle necessary to produce the predetermined taper of the tub or other container in which it is assembled.

At the completion of the movement of the positively actuated bar, the engaging devices on the carrier chain again operate to lock the stave thereto, the latter being then moved through the zone of the second cutter head by which the unfinished stave edge is planed. Thereafter, the locking devices release the stave and it is discharged from the machine.

More specifically described, with reference to the drawings, the operating mechanisms may be supported upon a frame of any suitable construction; that herein illustrated comprising pairs of upright members 1, supported upon bottom rails 2 and carrying top rails 3. Top cross members 4 and intermediate cross members 5 complete the frame structure.

Mounted on the cross members 4, are two pairs of longitudinally extending spaced guide rails 6, each pair supporting one of two endless carriers 7. The carriers preferably are of link-belt or chain type, and are operatively supported at the ends of the guide rails by sprockets 8 and 9, the upper runs of the carrier chains passing between the guide rails 6. The two front or receiving end sprockets 8 are mounted on a shaft 10 having suitable bearing supports 11 mounted on the frame members 3. The two rear or delivery end sprockets 9 are mounted on a shaft 12 having bearing supports 13 mounted on the other ends of the frame members 3. The shaft 12 carries a drive pulley 14 by which power is received for the operation of the chain carriers.

The guide rails 6 are adapted to give lateral and under support between the sprockets 8 and 9 to the upper runs respectively of the carrier chains 7 in such position that the upper surfaces of the chains preferably extend somewhat above the upper edges of the guide rails. In the present instance, inner rail elements 15 are provided for the under support of the chains, being suitably secured to the guide rails 6 with their upper supporting surfaces below and parallel to the upper edges of the guide rails. The rail elements 15 are spaced to provide a channel therebetween.

The carriers 7 are preferably of link belt construction comprising outer side links 16 (Figs. 7, 8 and 9) with their ends overlapping inner side links 17 and carrying cross pins 18 on which the inner links are pivoted. Spacer sleeves 19 are positioned between the pairs of inner links, the sleeves preferably being provided with bushings 20 as bearings for the pivot pins.

At regular intervals in the carriers 7 there are located stave engaging devices comprising specially formed pairs of links 21 (Figs. 7, 8 and 9), having upwardly projecting extensions, which latter are constructed at the front with shoulders 22, and at the rear with pointed portions 23. Operatively positioned between the links 21 of each device, and hinged on the forward pin 24, is a dog 25 also provided with an upward extension projecting substantially above the normal surface of the carriers 7 and having forwardly projecting teeth 26 formed on the front portion of the extension. In raised position of the hinged dog 25, the teeth 26 extend substantially in advance of the shoulders 22 on the links 21, while in lowered position the teeth 26 recede rearwardly of the shoulders 22. A roller 27 is mounted on the rear lower portion of the dog 25, suitably secured as by straps 28 supporting a pin 29 on which the roller is pivoted. The roller 27 swings below the normal under surface of the carrier chain with the pivotal movement of the dog 25 about the pin 24.

As herein illustrated, the stave engaging devices are positioned as every tenth pair of links, and the ten tooth sprockets 8 and 9 are of mutilated construction, one tooth being omitted and a recess provided in lieu thereof to accommodate the roller 27 in its passage over the sprocket, as illustrated at 30 in Fig. 4.

As each stave engaging device passes over the sprocket 8 at the beginning of the upper run of each carrier, the dog 25 swings downward by gravity, effecting the withdrawal of the engaging teeth 26 from before the link shoulders 22. Positioned beneath the upper run of each carrier and between the inner guide rails 15 are two successively arranged cam bars 31 and 32, which engage the rollers 27, lift the dogs 25, and thrust forward the teeth 26, holding the dogs in raised position while travelling the length of the respective bars. (See Fig. 4.) The cam bars 31 and 32 are resiliently mounted, being similarly supported in the construction illustrated (see Fig. 12), on cross bars 33, carried on compression springs 34, which latter are carried by bolts 35 suspended from the flanges of the guide rails 6.

Positioned above the upper run of each carrier is a longitudinally extending stave retaining bar 36, secured in spaced relation to the carrier chain by cross bars 37, adjustably supported on posts or bolts 38 mounted on the flanges of the rails 6 (see Figs. 10 and 15).

A stave hopper or magazine is located over the front portion of each of the carriers. In the present illustration a forward wall or stop 39 is formed of the turned up end of the retaining bar 36 (see Figs. 5 and 15). Laterally outward of each carrier is positioned a side wall 40 having one end turned inwardly to form an end wall 41 opposite to the forward wall 39. An upright stave positioning guide 42 is mounted on the inner side of the wall 40. The side wall 40 is laterally supported by a brace 43 from which a pair of rods 44 extend through and are adjustably secured to the side members 3 of the frame. For the under support of the staves in the hopper, there are provided a pair of brackets 45 suitably secured to the guide rails 6, and curved to the contour of the sides of the staves. A further intermediate support for the staves during their movement with the carriers is provided inwardly of each of the carriers by the similarly curved rest plates 46, (Figs. 2 and 14) supported on brackets 47, suitably secured to the guide rails 6.

The mechanism hereinbefore described comprises the means for propelling the staves through the machine and for supporting them during the shaping of their lateral edges. In operation, an attendant fills the hoppers with flatly stacked staves, illustrated at A, their lateral edges on the side toward the wall 40 being in approximate alinement and their forward ends in abutment with the stop 39. The forward moving upper runs of the carriers pass in close proximity beneath the bottom staves of each stack. As the projecting shoulders of the links 21 reach the stack they successively engage the end of the bottom stave and push it from beneath the stack into the space beneath the retaining bar 36, the remaining staves dropping down as the bottom one is removed. The pairs of links 21 are separated in the carriers by a slightly greater distance than the length of a stave, and when first engaged the stave is thus loosely positioned between successive pairs of links, the dog 25 being carried in receded position. While thus loosely moved forward, the stave is laterally engaged by other means hereinafter specifically described and one of its edges alined for shaping at the correct angle.

When the dog 25 reaches the cam bar 31, the roller 27 is engaged thereby and the dog is lifted, driving the teeth 26 forward into the adjacent end of the stave and forcing the forward end of the stave upon the knife-edged rear ends of the projecting portions of the preceding pair of links 21. The stave is thus locked in correct position for the first shaping operation, which latter is accomplished while the dog 25 travels the length of the cam bar 31, the moving position of the stave being illustrated at B and B'. If there be any slight variation in the lengths of the staves, the resilient support of the cam bar compensates therefor in varying the extent to which the teeth 26 are advanced in the upward movement of the dog.

Passing off the end of the cam bar 31, the dog 25 drops down and withdraws its engaging teeth from the stave, the latter being again loosely propelled by the forward shoulders of the links 21. During this stage the stave is laterally engaged by a second positioning means, hereinafter described, which alines the other edge of the stave for correct shaping as illustrated at C. Thereafter, the dog 25 reaches the second cam bar 32 and is operated to again lock the stave in its new position for the second shaping cut while the dog travels over the bar 32. As the dog drops off the end of the second cam bar, the stave is finally released, as shown at C', and loosely propelled out of the machine.

Describing now the lateral positioning means for successively alining the edges of the staves for the shaping cuts, and the means for cutting them, an operating shaft 48 is supported over each of the carriers 7, the axes of the shafts being in the same vertical plane with the axes of longitudinal movement of the respective carriers, but inclined upwardly toward the receiving end of the machine at an angle equal to the angle between the axis and the tapered side of a finished tub for which the staves are to be shaped.

The shafts 48 are respectively supported in bearings 49 carried by the archbars 50, 51 and 52, secured to the side members 3 of the frame. The shafts 48 are operated with a compound crank-driven reciprocatory motion, having a longitudinal movement at a speed on the forward travel of the shafts approximately equal, during the period of least acceleration, to the speed of the carriers 7, and having a rotative rocking movement timed with the successive passage of the stave engaging devices carried by the carriers.

The rear end portion of each shaft 48 is herein illustrated as being bent in the form of a crank 53, the latter being journalled in a bearing member 54 (Figs. 10 and 11), which is also provided with a transversely arranged bearing for a crank pin 55 on which the bearing member is movable longitudinally as well as rotatively. The pin 55 is carried by a crank 56 mounted on a short shaft 57. The axes of the shafts 57 are arranged at right angles to the vertical planes of the axes of the shafts 48. Bearings 58, secured to the extended upright end frame members 1, support the shafts 57, each of the latter carrying a sprocket 59 on its outer extended end. Chain belts 60 connect the sprockets 59 with the similarly dimensioned sprockets 61 (Fig. 10) mounted respectively on the outwardly extended ends of the carrier drive shaft 12, from which power is taken for the operation of the shafts 48. It will here be apparent that the compound crank connections between the shafts 57 and 48 effect the movement of the latter as above described, the length of the crank 56 determining the speed of the longitudinal movement of the shaft 48, and the similar speeds of the shafts 12 and 57 accomplishing the timing of the rotative movement of the shaft 48 with the movement of the carrier stave-engaging devices.

The mechanisms operable by the shafts 48 for laterally positioning the staves are arranged in two sets, one operable upon the successive staves as they leave the magazine in preparation for the shaping of one edge by the first of two pairs of cutters, the other shifting the staves across the carriers for the shaping of the opposite edges by the other pair of cutters.

First describing the cutters, the latter are preferably of the rotary type, similarly constructed, and each comprising a revolving head 62 in which are secured a plurality of radially extending knives 63. The heads 62 are respectively mounted on shafts 64 journaled in upper bearings 65 and lower bearings 66, suitably secured to the intermediate upper and lower cross members 4 and 5 of the machine frame and preferably braced for rigidity of alinement by integral bridge connections 67.

The first pair of cutters are positioned laterally outward of the two carriers respectively, with the paths of the knives adjacent the upper runs of the carriers. The shafts are preferably inclined outwardly from vertical at an angle necessary to give the desired radial bevel to the finished edge of the stave, the cutting knives preferably being shaped to describe a cylindrical cutting path. The second pair of cutters are positioned laterally inward of the two carriers and similarly adjacent thereto, with their shafts preferably inclined inwardly from vertical to give the correct bevel to the opposite edge of the staves.

Each of the cutter shafts carries a pulley 68, the front pair having belt connections 69 with drive pulleys 70, and the rear pair connected by belts 71 with drive pulleys 72, the drive pulleys 70 and 72 being respectively mounted on shafts 73 and 74, journaled in bearings 75 suitably secured to the rear and front frame members respectively. The shaft 73 is extended at one end to carry a main drive pulley 76 adapted for belt connection with a source of power, and on the extension of its opposite end is a pulley 77 having a belt connection 78 with a pulley 79 mounted on the extended end of the shaft 74, thereby transmitting power to each of the cutters.

Associated with each of the cutter heads is a chip catcher 80 supported on the upper laterally extended end of the upper cutter shaft bearing 65, and pivoted thereon for lateral swinging movement by the pin 81. The chip catchers are of box like construction with an upwardly inclined bottom wall adapted to receive the chips from the cutting knives and direct them upwardly into a suction conduit (not shown). The front face 82 of each chip catcher is adapted to contact resiliently the edge of the stave being cut, and is maintained in such contact by the springs 83 acting upon lugs extending laterally from the pivot bearings. As herein illustrated, the front faces of the first pair of chip catchers may be utilized as position guides for the staves. (See Fig. 5.)

The first of the stave positioning mechanisms for alining the staves as they leave the magazines comprises a pair of swinging positioning bars 84 pivotally supported on the arch-bar 52, one above each of the carriers 7 and extending laterally inward thereof. As constructed in the present instance (see Fig. 15), the bar 84 is secured to a strap 85 carrying a pivot pin 86 journaled in a bearing 87 mounted on the arch bar 52. The bearing 87 preferably is positioned with its axis above and parallel to the rock-shaft 48. The two bars 84 are connected across their end portions above the pivots 86 by a spring 88 which tends to resiliently force the lower ends of the bars outwardly toward the carriers 7.

Mounted on each of the shafts 48 is a swinging yoke 89, rigidly secured to the shaft as by means of the clamp bearings 90, and extending through the path of movement of the respective bars 84. In the rocking movement of the shafts 48, the yokes 89 are simultaneously swung inwardly into engagement with the bars 84, forcing the latter inwardly against the tension of the spring 88. The reverse movement of the shafts 48 carries the yokes outwardly, permitting the bars 84 to swing toward the carriers 7.

In its operation upon the staves, the mechanism just described is so positioned and operatively timed that the bars 84 are in their inward position as the successive staves emerge from the magazines loosely propelled on the carriers 7, and thus partially pass the respective bars. When the passing stave reaches the approximate position illustrated at B in Figs. 5 and 15, the yoke 89 is in reverse movement and the positioning bar 84 swings into engagement with the adjacent edge of the stave, and under the tension of the spring 88 forces the stave laterally until its opposite edge is in contact with the guide 42 on the side wall of the magazine and with the front face 82 of the chip catcher which it is approaching. This two point guiding contact effected by the intermediately applied force of the bar 84, assures the correct alinement of the loosely conveyed stave without respect to the width of the stave, in that the bar 84 follows through until it engages the inner stave edge and forces the outer stave edge against the guide pieces. Thereafter, the engaging devices on the carrier operate as previously described to lock the stave in alined position, whereupon the yoke 89 again swings the bar 84 inwardly free of the stave, and the latter travels through the zone of the adjacent cutter, receiving its finishing cut on the alined edge.

The second of the stave positioning mechanisms operates to aline the other edges of the staves for the finishing cut by the second pair of cutters. Mounted on each of the shafts 48 is a swinging positioning yoke 91, preferably having a short flat bar 92 cross-connecting its arms, and extending inwardly of and in its lowermost position substantially parallel to the respective carrier 7 over which the yoke is located. (See Fig. 12.) The yokes 91 are rigidly fastened to the shafts 48 by means of the clamp bearings 93 in which the yoke arms are secured. The relative lengths of the front and rear arms of each yoke, due to the inclination of the shaft 48, are such that the path described by the swinging bar 92 is similar to the tapered periphery of a finished tub for which the staves are to be shaped.

A second swinging positioning yoke 94 is loosely mounted on each of the shafts 48, its arms supporting a substantially longer flat connecting bar 95 extending outwardly of and in its lowermost position substantially parallel to the respective carrier 7 over which the yoke is located. The bar 95 is positioned opposite of the bar 92, the relative lengths of the front and rear arms by which the bar is suspended from the inclined shaft 48 being such that the path of the swinging bar 95 also is similar to the periphery of a finished tub. The arms of each of the yokes 94 are preferably secured in bearing members 96, the latter being rotatable on the shaft 48. Each of the yokes 91 and 94 have cross members 97 connecting the intermediate portions of their respective arms and rigidly secured thereto as by clamps 98.

Each of the positively actuated yokes 91 is connected to the loosely swinging yoke 94 on the opposite side of the machine by means resistantly variable in length. In the present instance each of these connections comprises a two-part bar 99, one part having an operative bearing on the cross member 97 of the yoke 91 on one side of the machine, and the other part having an operative bearing on the cross member 97 of the yoke 94 on the other side, the two parts intermediately overlapping in frictional engagement.

The overlapping portions of the parts are provided with longitudinal registering slots 100, in each registering pair of which is positioned a headed pin or bolt 101, carrying a compression spring 102 confined between the contacting parts of the bar and the nut or head of the bolt. By this means it will be apparent that the two parts may be relatively moved longitudinally against resiliently tensioned frictional resistance. The two yokes 91 are secured in relation to the shafts 48 so that the end positions of their outward strokes bring the bars 92 in parallel relation to the respective carriers 7 and in substantial alinement with the cutting tangent of the respective cutter heads.

In operation, the lastly described stave positioning mechanism operates upon the staves after the first shaping cut has been completed and the carrier stave-engaging devices have released the staves in loose relation to the carrier chain. At this stage the staves are advancing in the position illustrated at B′ in Fig. 2. At the same time the yokes 91 are swinging inwardly by operation of the shafts 48, and pushing outwardly the opposite yokes 94 through the two-part friction bars 99. As the yokes 94 move outwardly the bars 95 engage the stops 103, mounted on the frame of the machine, whereupon the continued inward swing of the yokes 91 cause the two parts of the bars 99 to slide upon each other and materially shorten the length of those connecting members. Also, the rock-shafts 48 are moving longitudinally rearward in opposition to the movement of the staves until the bars 95 are approximately opposite the center portions of the approaching pair of staves on the two carriers.

With the reversal of the rotative and longitudinal movements of the shaft 48 the bars 92 carried by the yokes 91 swing outwardly into engagement with the center portions of the inner edges of the respective staves and shift the latter outwardly across the carriers 7, meanwhile travelling with the staves at approximately the same rate of speed. As the staves move outwardly their finished outer edges engage the longer bars 95 carried by the yokes 94 and force them outwardly against the frictional resistance of the elongating two-part connecting bars 99.

The resistant pressure of the bars 95, and their substantially greater length than the pushing inner bars 92, effect the full length engagement of the guiding bars 95 with the finished outer edges of the staves, thereby controlling the angular relation between the finished edges of the respective staves and the line on which the unfinished inner edges will be cut as positioned at the end of the stroke of the pushing bar 92. Thereupon, the engaging devices of the carriers 7 again operate to lock the staves in their new positions, and they are carried forward to the second pair of cutters for the finishing cuts on the inner edges, while the yokes 91 and 94 recede from the staves with the change of direction of movements of the shafts 48.

By reason of the angular relation between the axis of the inclined shaft 48 and longitudinal axis of the bar 95 operatively supported thereby (which relation is identical with that between the axis and the periphery of a finished tub), the successive positions of the bar 95, as it is pushed away from the line on which the second lateral stave edge will be cut, are in progressively wider angular relation to that cutting line, and the laterally moving staves, of whatever width, are finally positioned and locked on the carriers for the finishing cut of the second stave edge with an accurate taper between the two finished edges, proportionate to the width of the individual staves.

After the finishing cut of the second edges of staves, the latter are again released from the locking devices, carried out from under the retaining bar 36 and discharged from the machine.

I claim as my invention:

1. Apparatus of the class described comprising, in combination, conveying means adapted to receive and forward a succession of staves of variable width, means for shifting the staves on said conveying means to a predetermined position for cutting one lateral edge, means for reversely shifting the staves into position for cutting the opposite lateral edge in variable angular relation to the first lateral edge proportionate to the width of the respective staves, releasable means for securing said staves in the respective positions on said conveying means, and means for cutting the edges of the respectively positioned staves.

2. Apparatus of the class described comprising, in combination, a conveyor adapted to propel a succession of staves, cutting means arranged for operation upon one lateral edge of said staves, means operable to secure said staves on said conveyor, and means for laterally positioning said staves before the operation of said securing means comprising stationary lateral guides positioned for the successive abutment and alinement of one edge of said staves, a bar resiliently actuated to successively engage the opposite lateral edge of said staves and move the staves into abutment with said guides, and a positively actuated reciprocatory member operable to engage said bar and intermittently move the same in reverse direction, the movement of said reciprocatory member being timed to effect the reverse movement of said bar coincidently with the approach of successive staves.

3. Apparatus of the class described comprising, in combination, a conveyor adapted to receive and propel a regularly spaced succession of staves, cutting means arranged for operation upon one lateral edge of said staves, means operable to secure said staves on said conveyor, and means for laterally positioning said staves before the operation of said securing means comprising lateral guides positioned for the successive abutment and alinement for cutting of one edge of said staves, a pivotally supported bar positioned oppositely of said guides, resilient means normally tending to swing said bar toward said guides into lateral engagement with said staves, a rock-shaft positioned adjacent said bar having a swinging member rigidly mounted thereon, said member being arranged to engage said bar intermittently and move same away from said guides, and operating connections between said conveyor and said rock-shaft, adapted to synchronize the movements of said bar and said staves.

4. In apparatus of the class described, having means for forwarding a successive series of staves and the like, means for laterally adjusting the position of said staves comprising guides positioned for lateral abutment by said staves successively, a reciprocatory member supported oppositely of said guides and resiliently actuated to engage said staves and move them into abutment with said guides, a second reciprocatory member operatively supported adjacent said first member and positively actuated to engage said first member and intermittently move said first member away from said guides, means for actuating said second member, and operating connections between said actuating means and said stave forwarding means to synchronize the movements of said bar and said staves.

5. In apparatus of the class described, the combination of a conveyor for staves, guides positioned laterally of said conveyor, a bar having a pivotal support above said conveyor and extending laterally of said conveyor opposite of said guides, resilient means for swinging said bar toward said conveyor and into shifting engagement with passing staves, a rock-shaft positioned adjacent said bar, and a yoke rigidly secured to said rock-shaft adapted to engage said bar and intermittently move the same away from said conveyor to permit the advance of successive staves, said rock-shaft being positively actuated in synchronism with the successive movement of the staves.

6. Apparatus of the class described comprising, in combination, a conveyor for moving a successive series of staves, a plurality of means for successively cutting the lateral edges of said staves, releasable means for securing said staves during the cutting operations, means for positioning the respective staves for the cutting of one lateral edge, and means for positioning the respective staves for the cutting of the opposite lateral edge in angular relation to the first edge varying with the width of the stave, comprising a resistantly movable reciprocatory guide member normally disposed laterally adjacent to said conveyor, said guide member being operatively supported for movement laterally away from said conveyor with progressively increasing angular relation to the longitudinal axis of said conveyor, a positively actuated reciprocatory push member positioned opposite to said guide member and adapted to engage successive staves on said conveyor and push said staves laterally against the resistant engagement of said guide member to cutting position, means for effecting the return movement of said guide member, means for actuating said push member, and operating connections between said actuating means and said conveyor to synchronize the movement of said push member with the successive advance of the staves.

7. In apparatus of the class described, having means for longitudinally moving a succession of staves and the like, means for laterally adjusting the position of said staves with one edge disposed in predetermined angular relation to the axis of their movement, comprising a resistantly movable reciprocatory guide member normally disposed laterally adjacent to the path of movement of said staves, said guide member being operatively supported for lateral outward movement with progressively increasing angular relation to the longitudinal axis of movement of said staves, a positively actuated reciprocatory push member positioned opposite to said guide member and adapted to engage successive staves and push the same laterally against the resistant engagement of said guide member to a predetermined position, means for effecting the return movement of said guide member, means for actuating said push member, and operating connections between said actuating means and said stave moving means to synchronize the movement of said push member with the successive advance of the staves.

8. Apparatus of the class described comprising, in combination, a conveyor for successively moving a series of staves, a plurality of means for cutting the lateral edges of said staves, means for securing said staves while being cut, means for successively positioning the staves for the cutting of one lateral edge, and means for successively positioning the staves for the cutting of the opposite lateral edge in variable angular relation to the first finished edge, comprising a swinging guide bar disposed laterally of the finished edge of the successively advanced staves, said bar being operatively supported above said conveyor on a pivotal axis angularly related to the longitudinal axis of said conveyor, means for swinging said bar toward said conveyor and resistantly opposing its movement away from said conveyor, a swinging push bar disposed laterally of the unfinished edge of the successively advanced staves, said bar being reciprocally operable to engage said staves and successively push them into opposite engagement with said guide bar and to a predetermined position on said conveyor, and means for positively actuating said push bar in synchronism with the successive movement of said staves.

9. In apparatus of the class described, the combination of a conveyor for successively moving a series of staves, a rock-shaft supported thereover having its axis in angular relation to the longitudinal axis of said conveyor, a swinging yoke loosely supported on said shaft and carrying a guide bar extending laterally of said conveyor and substantially parallel thereto in lowermost position, a second swinging yoke rigidly supported on said shaft and carrying a push bar extending laterally of said conveyor opposite to said guide bar, said bars being adapted to laterally embrace the staves successively moved therebetween, said push bar having a predetermined limit of positive swinging movement toward said conveyor, means for swinging said guide bar into engagement with said staves and resistantly opposing its reverse movement by the positive action of said push bar upon the interpositioned stave, and means for actuating said rock-shaft synchronously with the successive movement of the staves.

10. In apparatus of the class described, in combination, a pair of spaced conveyors for successively moving series of staves, a rock shaft supported over each of said conveyors, said rock-shafts having their axes in angular relation to the longitudinal axes of the respective conveyors, a swinging yoke loosely supported on each of said rock-shafts, each yoke carrying a guide bar extending laterally outward of its respective conveyor and substantially parallel thereto in lowermost position, a second swinging yoke rigidly supported on each of said shafts, each of said second yokes carrying a push bar extending laterally inward of its respective conveyor oppositely of the respective guide bars and having a predetermined limit of positive movement toward said conveyor, the pairs of said bars being adapted to laterally embrace the staves respectively moved therebetween by said conveyors, a pair of resistantly elongatable connecting bars respectively connecting the first mentioned yoke associated with each conveyor to the second mentioned yoke associated with the other conveyor, and means for actuating said rock-shafts in opposite rotative movement in synchronism with the successive movement of the staves.

11. In apparatus of the class described, in combination, a pair of spaced rock-shafts operable in opposite direction, a swinging yoke loosely mounted on each of said shafts, a second swinging yoke rigidly mounted on each of said shafts, the yokes on each shaft being adapted to embrace a stave therebetween, and a pair of resistantly elongatable bars connecting each of said rigidly mounted yokes to the loosely mounted yoke on the other shaft, said bars comprising two partially overlapping parts having a plurality of registering slots in the overlapping portions thereof, guide pins positioned in said slots, and resilient means carried by said pins arranged to secure said overlapping parts in frictional engagement.

12. In apparatus of the class described, in combination, a conveyor for moving a succession of staves, a shaft supported thereover having its axis in angular relation to the longitudinal axis of said conveyor, said shaft being simultaneously operable with a rotary rocking movement and a longitudinal reciprocatory movement, a pair of swinging yokes supported on said shaft carrying bars adapted to engage therebetween the successively moving staves, said yokes being moved longitudinally by said shaft in similar direction with said staves while said bars are engaged therewith, and means for actuating said shaft synchronously with the successive movement of the staves.

13. In apparatus of the class described, the combination of a conveyor for moving a succession of regularly spaced staves, a shaft carrying a sprocket operatively supporting said conveyor, a rock shaft operatively supported over said conveyor, swinging members on said rock shaft adapted to engage the successive staves by the operation of said rock-shaft, a short shaft positioned substantially perpendicular to said rock shaft, driving connections between said first mentioned shaft and said short shaft for operating said shafts at similar speed, a crank on said short shaft, a crank on said rock-shaft, crank pins on the respective cranks, and a compound bearing member operatively receiving said pins whereby both rotative and longitudinal movement is imparted to said rock shaft in synchronism with the movement of the successive staves by said conveyor.

14. Apparatus of the class described comprising, in combination, means for forwarding a succession of staves of variable width, means for successively shifting the staves to a predetermined position of one lateral edge, means for reversely shifting the staves to a predetermined position of the other lateral edge in variable angular relation to the first lateral edge proportionate to the width of the respective staves, and means for cutting the respectively positioned lateral edges.

15. In apparatus of the class described, having an under support for a stave, means for laterally shifting said stave to a predetermined position comprising, in combination, guides positioned for lateral abutment by said stave, a reciprocatory member positioned oppositely of said guides and resiliently actuated to laterally engage said stave and move it into abutment with said guides, and a second reciprocatory member positively operable to engage said first member and move it away from said stave.

16. In apparatus of the class described, a carrier for moving a regularly spaced series of staves, a reciprocatory stave positioning member operatively supported on one side of the path of said staves, another reciprocatory stave positioning member operatively supported on the other side of the path of said staves, said members being operable in opposite directions for simultaneous engagement with the lateral edges of said staves, one of said members being positively actuated to move a passing stave to a predetermined lateral position, the other of said members being resistantly reversible by the positive opposite lateral movement of said stave after engagement therewith, and means for operating said stave positioning members in cycles coincident with the passage of successive staves.

17. In apparatus of the class described, having an under support for a stave, means for laterally shifting said stave to a predetermined position comprising, in combination, a reciprocatory member operatively supported on one side of said stave, and another reciprocatory member operatively supported on the other side of said stave, said members being operable in opposite directions for simultaneous engagement with the lateral edges of said stave, one of said members being positively actuated to move said stave to the predetermined position, the other of said members being resistantly reversible by the positive movement of said stave after engagement therewith.

18. In apparatus of the class described, means for moving a series of staves in regular succession, a shaft, means for imparting oscillating movement to said shaft in cycles coincident with the successive movement of said staves, a member rigidly mounted on said shaft and extending at one side of the path of said staves, said member being operable to laterally engage a passing stave and move it to a predetermined lateral position, another member loosely mounted on said shaft and extending at the opposite side of the path of said staves, and resistantly reversible means for oppositely moving said second member into engagement with said passing stave simultaneously with said first member.

19. In apparatus of the class described, means for moving a series of staves in regular succession, a member extending at one side of the path of said staves and pivotally mounted for movement across said path, means for positively moving said member in oscillatory cycles coincident with the passage of successive staves, said member being adapted to engage said staves and move them to a predetermined lateral position, a second member extending at the other side of the path of said staves and pivotally mounted for movement across said path, and resistantly reversible means for oppositely moving said second member into engagement with said staves simultaneously with said first member.

20. In apparatus of the class described, means for moving a series of staves in regular succession, a member extending at one side of the path of said staves and pivotally mounted for movement across said path, means for positively moving said member into lateral engagement with said staves successively and shifting them to a predetermined lateral position, a second member extending at the other side of the path of said staves and pivotally mounted on an axis in a common plane with and angularly related to the axis of said path, and resistantly reversible means for oppositely moving said second member into engagement with said staves simultaneously with said first member.

21. In apparatus of the class described, a carrier for advancing a series of staves, and means for laterally adjusting the position of said staves on said carrier with one edge disposed in variable angular relation to the axis of advance movement of said staves proportionately to the width of the respective staves, comprising a resistantly movable guide member normally disposed laterally adjacent to the path of movement of said staves, said guide member being operatively supported for lateral outward movement with progressively increasing angular relation to the axis of advance movement of said staves, and a positively actuated push member positioned opposite to said guide member adapted to engage successive staves and push the same laterally against the resistant engagement of said guide member to a predetermined position.

22. In apparatus of the class described, a carrier for advancing a series of staves, cutting means laterally adjacent the path of said advancing staves, and means for positioning the staves for the cutting of one lateral edge in variable angular relation to the other edge proportionately to the width of the respective staves, comprising a swinging guide bar laterally disposed at one side of the advancing staves, said bar being operatively supported above said carrier on a pivotal axis angularly related to the longitudinal axis of said carrier, means for swinging said bar toward said carrier and resistantly opposing its movement away from said carrier, a swinging push bar laterally disposed at the other side of the advancing staves, and means for positively actuating said push bar to engage said staves and successively push them into opposite engagement with said guide bar to a predetermined lateral position on said carrier.

23. In apparatus of the class described, means for forwarding a succession of staves, and means for successively shifting said staves to a predetermined lateral position comprising, in combination, guides positioned for lateral abutment by said staves, a reciprocatory member positioned oppositely of said guides adapted to resiliently engage said staves and move them laterally into abutment with said guides, and means for actuating said reciprocatory member coincidently with the successive passage of said staves.

24. Apparatus of the class described, comprising in combination, means for forwarding a succession of staves, means positioned adjacent said forwarding means for cutting the edges of said staves in passage thereby, means for alining said staves for said cutting operation having a reciprocatory member operable coincidently with the successive passage of said staves to engage said staves and laterally shift them to a predetermined position on said forwarding means, and means for securing said staves to said forwarding means in shifting position.

25. Apparatus of the class described, comprising, in combination, means for forwarding a succession of staves, a pair of devices positioned successively at opposite sides of said forwarding means for successively cutting the opposite edges of said staves in passage thereby, reciprocatory means operable coincidently with the successive passage of said staves to shift said staves to a predetermined position on said forwarding means with one edge in alinement with the first of said cutting devices, reciprocatory means operable coincidently with the successive passage of said staves from said first cutting device to shift said staves to a predetermined position on said forwarding means with the opposite edge in alinement with the second of said cutting devices, and means for securing said staves to said forwarding means in the respective positions.

In witness whereof I have hereunto attached my signature.

AXEL M. WALSTROM.